June 14, 1966 H. SCHOLL 3,256,449
MULTIVIBRATOR TYPE ELECTRONIC SWITCH
Filed Dec. 24, 1963

INVENTOR
Hermann Scholl
by
Michael J. Striker
Atty 3,256,449
MULTIVIBRATOR TYPE ELECTRONIC SWITCH
Hermann Scholl, Stuttgart, Germany, assignor to Robert Bosch G.m.b.H., Stuttgart, Germany
Filed Dec. 24, 1963, Ser. No. 333,037
Claims priority, application Germany, Jan. 5, 1963, B 70,226
8 Claims. (Cl. 307—88.5)

Figure 1:
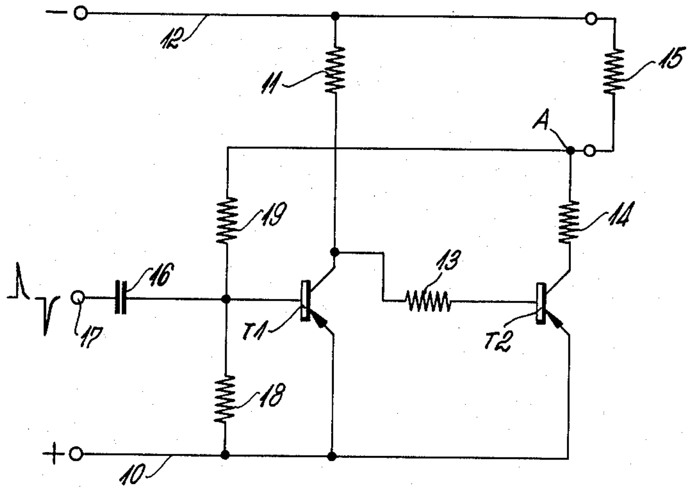

This invention concerns an electronic switch and more specifically a multivibrator type switch which comprises at least one input transistor and at least one output transistor. Conventional multivibrator arrangements of this type are usually so arranged that a series-combination of a load resistance and low-resistance resistor is connected in the emitter-collector circuit of the output transistor.

The semi-conductor elements of such arrangements or switches can be protected against overload during operation by suitably dimensioning its components provided that the circuits operated by the semi-conductor elements are circuits closed within the arrangement. However, it has been found that such known means often are insufficient for protecting the output transistors arranged in the output circuit of the arrangement against such overload which could be caused easily by a load resistance assuming too small a value or by a short-circuit. The energy that can be handled by the output transistors is under such circumstances usually not limited by the waste heat developing in the transistors, but rather by the maximum permissible voltages and currents across these transistors. These limit values must not be exceeded under any circumstances not even for a very brief period.

Consequently, if a protection against overload is to be provided, the condition must be met that such protective means respond to current increases of only a few percent and so rapidly that even in the case of a short-circuit the current cannot rise to intolerable high values within the time of response of the protective means. As is well known, neither conventional fuses nor electromagnetic protective devices can perform in this manner.

It is therefore one object of this invention to provide for an electronic switch arrangement of the above-mentioned type which is safely protected against any kind of unexpected overload.

It is another object of this invention to provide for a multivibrator type electronic switch as mentioned above which is composed of a comparatively very small number of components and entirely reliable in operation.

With above objects in view the invention includes a multivibrator type electronic switch comprising, in combination: a source of direct current operating voltage; input means for introducing a trigger impulse; at least one input transistor means having a base electrode, an emitter electrode and a collector electrode, said base electrode being connected to said input means; at least one output transistor means having a base electrode, an emitter electrode and a collector electrode, said emitter electrodes of both said transistor means being connected to one terminal of said source, said collector electrode of said input transistor means being connected to the other terminal of said source, and a series combination of a low-resistance resistor and a highly resistive load resistance means being connected betwen said collector electrode of said output transistor means and said other terminal of said source, said collector electrode of said input transistor means being additionally connected to said base electrode of said output transistor means; and voltage divider means connected in parallel with the emitter-collector circuit of said output transistor means and with said low-resistance resistor and having an intermediate tapping point connected to said base of said input transistor means.

Figure 2:
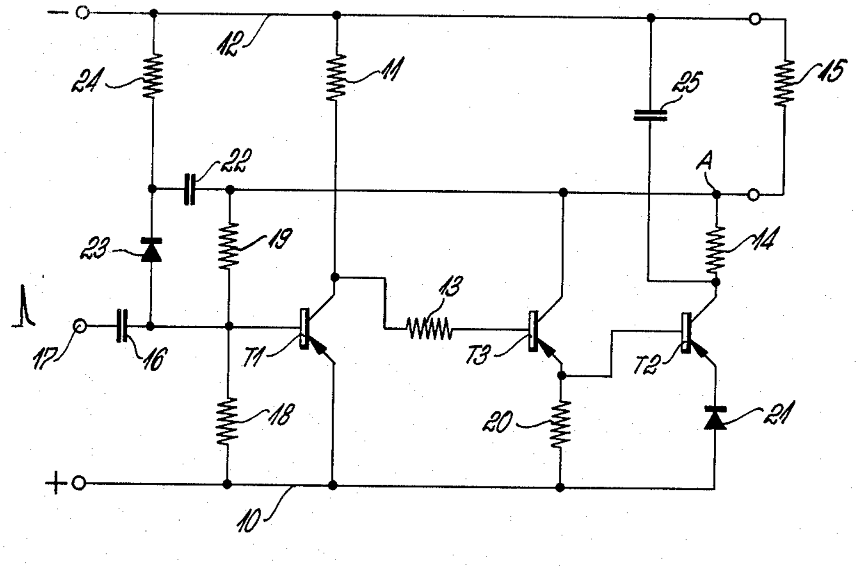

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a schematic circuit diagram of one embodiment of the invention in which the electronic switch is a bistable multivibrator arrangement; and FIG. 2 is a similar schematic circuit diagram of another embodiment of the invention which comprises a monostable multivibrator arrangement.

Referring now to FIG. 1, it can be seen that this electronic switch arrangement comprises an input transistor T1 and an output transistor T2, both being of the PNP-type. Both these transistors have their emitter electrodes connected to a line 10 carrying positive potential furnished by a source of operating voltage not illustrated. The collector of the input transistor T1 is connected via a resistor 11 to a line 12 carrying negative potential and connected to the other terminal of said source. Additionally the collector electrode of the transistor T1 is connected via a feedback resistor 13 to the base electrode of the output transistor T2. The collector of the output transistor T2 is also connected to the negative voltage carrying line 12 but via a series-combination of a low-resistance resistor 14 and a load resistance 15. The base electrode of the input transistor T1 is connected via a capacitor 16 to an input terminal 17 which is to be assumed as being adapted to receive trigger impulses for actuating the arrangement. In addition, in accordance with the invention a voltage divider consisting of resistors 18 and 19 is provided which is connected in parallel with the emitter-collector circuit of the output transistor T2 and also with the low-resistance resistor 14 by having one end connected to the positive voltage carrying line 10 and its other end connected to a junction point A between the resistances 14 and 15. However the junction point between the resistors 18 and 19 of the voltage divider is also connected to the base electrode of the input transistor T1. The resistor 19 is also to be considered as a feedback resistor. The arrangement, as can be seen, constitutes a bistable multivibrator arrangement which has two stable conditions of which one may be called its idle or normal condition while its second stable condition may be called its operative condition. In the first or idle condition the transistor T1 is conductive and consequently the output transistor T2 is non-conductive. If now a trigger impulse which is more positive than the potential of the positive line 10 is applied to the input terminal 17, then the arrangement is tripped into its operative condition which means that now the input transistor T1 is rendered non-conductive while the output transistor T2 is rendered conductive. Under these conditions the junction point A will carry a potential which is e.g. about .5 volt negative relative to the positive voltage carrying line 10. When this is the case the potenital at the intermediate tapping point or junction point of the voltage divider 18, 19 which is connected at one end with the junction point A is just about below that potential which would be necessary for changing the input transistor T1 from its non-conductive condition to its conductive condition. However, as soon as the load current passing through the output transistor T2 and through the resistors 14 and 15 exceeds e.g. due to a short-circuit its permissible maximum value, then the potential at the junction point A is shifted in negative direction. This results in rendering the input transistor T1 conductive and as a result the arrangement is tripped immediately back to its normal condition. Hereby the output transistor T2 is blocked and thus an overload thereof is made impossible. After such a cycle of operation the switch arrangement may be again triggered by another positive triggering or trigger impulse to change to its operative condition provided that the trouble which caused the short-circuit is eliminated.

Referring now to FIG. 2, it will be seen that this arrangement comprises a multivibrator of the monostable type. As far as the same components are used in this arrangement as in FIG. 1 the same reference numerals have been applied. The arrangement comprises in its monostable multivibrator portion two transistors namely an input transistor T1 and an auxiliary transistor T3, and additionally an output stage containing an output transistor T2.

A coupling resistor 13 is connected between the collector electrode of the input transistor T1 and the base electrode of the auxiliary transistor T3. The emitter electrode of this transistor is connected via a resistor 20 with the positive voltage carrying line 10 and also directly to the base electrode of the output transistor T2. The emitter of the electrode of this output transistor T2 is connected via a germanium diode 21 in the manner illustrated to the positive line 10. This germanium diode is provided as a non-linear resistance means which has a temperature dependent characteristic equal or substantially equal to that of the input transistor T1. The collector of the auxiliary transistor T3 is connected to a junction point in the line which connects the voltage divider or feedback resistor 19 with the above-mentioned junction point A, and a second junction point in this connection is connected via a coupling capacitor 22 and a diode 23 to the base electrode of the input transistor T1. The coupling capacitor 22 is additionally connected via a discharge resistor 24 with the negative line 12. A capacitor 25 is connected in parallel with the series combination of resistances 14 and 15 in order to limit voltage peaks which may develop when the load resistance 15 being of inductive character is switched off.

The operation of the arrangement according to FIG. 2 is as follows. When the arrangement is in its stable or normal condition, then the input transistor T1 is conductive while the auxiliary transistor T3 and the output transistor T2 is consequently non-conductive. If now a trigger impulse having a potential which is more positive than that of the positive line 10 is applied to the input terminal 17, the arrangement is changed to its unstable second condition in which the transistors T3 and T2 are conductive while the input transistor T1 is blocked. This condition will last until the coupling capacitor 22 has discharged its potential through resistor 24 to such an extent that the potential of the capacitor 22 equals the potential of the positive line 10. At this moment the arrangement is abruptly returned automatically to its stable normal condition.

However, should the load current flowing through the output transistor T2 exceed the maximum permissible value thereof during the unstable condition of the arrangement, then the potential of the junction point A becomes negative to such a degree that the input transistor T1 is changed by the function of the voltage divider 18, 19 to its conductive condition. As a consequence, both transistors T2 and T3 are immediately rendered non-conductive and thus protected against overload.

It will be understood that the limit value of the load current passing through the transistor T2 and causing the arrangement to skip back to its stable condition depends largely on the temperature of the circuit components particularly the temperature of the input transistor T1 because it is well known that transistors of this type have a characteristic critical voltage which changes by about 2 mv. for a temperature change of one centigrade. However, by providing the above-mentioned temperature-dependent resistance in the form of a germanium diode 21 in the emitter circuit of the output transistor T2 this dependence on temperature changes is practically completely compensated because the critical voltage of the diode 21 changes in a substantially identical or at least similar manner as that of the transistor T1 as the temperature of the circuit changes.

It will be understood that each of the elements described above or two or more together, may also find a useful application in other types of a multivibrator type electronic switch differing from the types described above.

While the invention has been illustrated and described as embodied in a multivibrator type electronic switch including overload protection means, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed and desired to be secured by Letters Patent is:

1. A multivibrator type electronic switch, comprising, in combination, a source of direct current operating voltage; input means for introducing a trigger impulse; at least one input transistor means having a base electrode, an emitter electrode and a collector electrode, said base electrode being connected to said input means; at least one output transistor means having a base electrode, an emitter electrode and a collector electrode, said emitter electrodes of both said transistor means being connected to one terminal of said source, said collector electrode of said input transistor means being connected to the other terminal of said source, and a series-combination of a low-resistance resistor and a highly resistive load resistance means being connected between said collector electrode of said output transistor means and said other terminal of said source, said collector electrode of said input transistor means being additionally connected to said base electrode of said output transistor means; and voltage divider means connected in parallel with the emitter-collector circuit of said output transistor means and with said low-resistance resistor and having an intermediate tapping point connected to said base of said input transistor means.

2. A multivibrator type electronic switch, comprising, in combintion, a source of direct current operating voltage; input means for introducing a trigger impulse; at least one input transistor means having a base electrode, an emitter electrode and a collector electrode, said base electrode being connected to said input means; at least one output transistor means having a base electrode, an emitter electrode and a collector electrode, said emitter electrodes of both said transistor means being connected to one terminal of said source, said collector electrode of said input transistor means being connected to the other terminal of said source, and a series-combination of a low resistance resistor and a highly resistive load resistance means being connected between said collector electrode of said output transistor means and said other terminal of said source, capacitor means being connected in parallel with said series-combination, said collector electrode of said input transistor means being additionally connected to said base electrode of said output transistor means; and voltage divider means connected in parallel with the emitter-collector circuit of said output transistor means and with said low-resistance resistor and having an intermediate tapping point connected to said base of said input transistor means.

3. A multivibrator type electronic switch, comprising, in combination, a source of direct current operating voltage; input means for introducing a trigger impulse; at least one input transistor means having a base electrode, an emitter electrode and a collector electrode, said base electrode being connected to said input means; at least one output transistor means having a base electrode, an emitter electrode and a collector electrode, said emitter electrode of said input transistor means being connected to one terminal of said source, non-linear resistance means being connected between said emitter electrode of said output transistor means and said one terminal of said source and having a temperature dependent characteristic substantially equal to that of said input transistor, said collector electrode of said input transistor means being connected to the other terminal of said source, and a series-combination of a low-resistance resistor and a highly resistive load resistance means being connected between said collector electrode of said output transistor means and said other terminal of said source, said collector electrode of said input transistor means being additionally connected to said base electrode of said output transistor means; and voltage divider means connected in parallel with the emitter-collector circuit of said output transistor means and with said low-resistance resistor and having an intermediate tapping point connected to said base of said input transistor means.

4. A multivibrator type electronic switch, comprising, in combination, a source of direct current operating voltage; input means for introducing a trigger impulse; at least one input transistor means having a base electrode, an emitter electrode and a collector electrode, said base electrode being connected to said input means; at least one output transistor means having a base electrode, an emitter electrode and a collector electrode, said emitter electrode of said input transistor means being connected to one terminal of said source, non-linear resistance means being connected between said emitter electrode of said output transistor means and said one terminal of said source and having a temperature dependent characteristic substantially equal to that of said input transistor, said collector electrode of said input transistor means being connected to the other terminal of said source, and a series-combination of low-resistance resistor and a highly resistive load resistance means being connected between said collector electrode of said output transistor means and said other terminal of said source, capacitor means being connected in parallel with said series-combination, said collector electrode of said input transistor means being additionally connected to said base electrode of said output transistor means; and voltage divider means connected in parallel with the emitter-collector circuit of said output transistor means and with said low-resistance resistor and having an intermediate tapping point connected to said base of said input transistor means.

5. A multivibrator type electronic switch, comprising, in combination, a source of direct current operating voltage; input means for introducing a trigger impulse; a monostable relaxation oscillator comprising at least one input transistor means having a base electrode, an emitter electrode and a collector electrode, said base electrode being connected to said input means, and auxiliary transistor means having a base electrode connected to said collector electrode of said input transistor means, an emitter electrode and a collector electrode; at least one output transistor means having a base electrode, an emitter electrode and a collector electrode, said emitter electrodes of all of said transistor means being connected to one terminal of said source, said collector electrode of said input transistor means being connected to the other terminal of said source, and a series-combination of a low-resistance resistor and a highly resistive load resistance means being connected between said collector electrode of said output transistor means and said other terminal of said source, said collector electrode of said input transistor means being additionally connected to said base electrode of said auxiliary transistor means, said emitter electrode of said auxiliary transistor means being additionally connected to said base electrode of said output transistor means; and voltage divider means connected in parallel with the emitter-collector circuit of said auxiliary and that of said output transistor means and with said low-resistance resistor and having an intermediate tapping point connected to said base of said input transistor means.

6. A multivibrator type electronic switch, comprising, in combination, a source of direct current operating voltage; input means for introducing a trigger impulse; a monostable relaxation oscillator comprising at least one input transistor means having a base electrode, an emitter electrode and a collector electrode, said base electrode being connected to said input means, and auxiliary transistor means being a base electrode connected to said collector electrode of said input transistor means, an emitter electrode and a collector electrode; at least one output transistor means having a base electrode, an emitter electrode and a collector electrode, said emitter electrodes of all of said transistor means being connected to one terminal of said source, said collector electrode of said input transistor means being connected to the other terminal of said source, and a series-combination of a low-resistance resistor and a highly resistive load resistance means being connected between said collector electrode of said output transistor means and said other terminal of said source, capacitor means being connected in parallel with said series-combination, said collector electrode of said input transistor means being additionally connected to said base electrode of said auxiliary transistor means, said emitter electrode of said auxiliary transistor means being additionally connected to said base electrode of said output transistor means; and voltage divider means connected in parallel with the emitter-collector circuit of said auxiliary and that of said output transistor means and with said low-resistance resistor and having an intermediate tapping point connected to said base of said input transistor means.

7. A multivibrator type electronic switch, comprising, in combination, a source of direct current operating voltage; input means for introducing a trigger impulse; a monostable relaxation oscillator comprising at least one input transistor means having a base electrode, an emitter electrode and a collector electrode, said base electrode being connected to said input means, and auxiliary transistor means having a base electrode connected to said collector electrode of said input transistor means, an emitter electrode and a collector electrode; at least one output transistor means having a base electrode, an emitter electrode and a collector electrode, said emitter electrodes of said input and auxiliary transistor means being connected to one terminal of said source, non-linear resistance means being connected between said emitter electrode of said output transistor means and said one terminal of said source and having a temperature dependent characteristic substantially equal to that of said input transistor, said collector electrode of said input transistor means being connected to the other terminal of said source, and a series combination of a low-resistance resistor and a highly resistive load resistance means being connected between said collector electrode of said output transistor means and said other terminal of said source, said collector electrode of said input transistor means being additionally connected to said base electrode of said auxiliary transistor means, said emitter electrode of said auxiliary transistor means being additionally connected to said base electrode of said output transistor means; and voltage divider means connected in parallel with the emitter-collector circuit of said auxiliary and that of said output transistor means and with said low-resistance resistor and having an intermediate tapping point connected to said base of said input transistor means.

8. A multivibrator type electronic switch, comprising, in combination, a source of direct current operating voltage; input means for introducing a trigger impulse; a monostable relaxation oscillator comprising at least one input transistor means having a base electrode, an emitter electrode and a collector electrode, said base electrode being connected to said input means, and auxiliary transistor means having a base electrode connected to said collector electrode of said input transistor means, an emitter electrode and a collector electrode; at least one output transistor means having a base electrode, an emitter electrode and a collector electrode, said emitter electrodes of said input and auxiliary transistor means being connected to one terminal of said source, non-linear resistance means being connected between said emitter electrode of said output transistor means and said one terminal of said source and having a temperature dependent characteristic substantially equal to that of said input transistor, said collector electrode of said input transistor means being connected to the other terminal of said source, and a series-combination of a low-resistance resistor and a highly resistive load resistance means being connected between said collector electrode of said output transistor means and said other terminal of said source, capacitor means being connected in parallel with said series-combination, said collector electrode of said input transistor means being additionally connected to said base electrode of said auxiliary transistor means, said emitter electrode of said auxiliary transistor means being additionally connected to said base electrode of said output transistor means; and voltage divider means connected in parallel with the emitter-collector circuit of said auxiliary and that of said output transistor means and with said low-resistance resistor and having an intermediate tapping point connected to said base of said input transistor means.

No references cited.

ARTHUR GAUSS, *Primary Examiner.*

J. BUSCH, *Assistant Examiner.*